United States Patent
Lee et al.

(10) Patent No.: US 7,055,058 B2
(45) Date of Patent: May 30, 2006

(54) SELF-HEALING LOG-STRUCTURED RAID

(75) Inventors: Edward K. Lee, Mountain View, CA (US); Boon-Lock Yeo, Sunnyvale, CA (US)

(73) Assignees: Boon Storage Technologies, Inc., Fountain Valley, CA (US); Swam Networks, Inc., Cupertino, CA (US); Middlefield Ventures, Inc., Santa Clara, CA (US); Synapse Fund I, LLC, Fountain Valley, CA (US); Synapse Fund II, LLC, Fountain Valley, CA (US); Jeffrey Caspe, Chicago, IL (US); Nike Partners, L.P., Beverly Hills, CA (US); Thomas R. Hutchison, Des Moines, IA (US)

( * ) Notice: Subject to any disclaimer, the term of this patent is extended or adjusted under 35 U.S.C. 154(b) by 504 days.

(21) Appl. No.: 10/314,145

(22) Filed: Dec. 9, 2002

(65) Prior Publication Data

US 2003/0120863 A1 Jun. 26, 2003

Related U.S. Application Data

(60) Provisional application No. 60/343,942, filed on Dec. 26, 2001.

(51) Int. Cl.
*G06F 11/00* (2006.01)
(52) U.S. Cl. .............................. 714/7; 714/20; 711/114
(58) Field of Classification Search .................... 714/7, 714/20; 711/114
See application file for complete search history.

(56) References Cited

U.S. PATENT DOCUMENTS

| | | | | |
|---|---|---|---|---|
| 5,257,362 A | * | 10/1993 | Menon | 711/114 |
| 5,271,012 A | * | 12/1993 | Blaum et al. | 714/6 |
| 5,502,836 A | * | 3/1996 | Hale et al. | 711/170 |
| 5,615,352 A | * | 3/1997 | Jacobson et al. | 711/114 |
| 5,754,756 A | * | 5/1998 | Watanabe et al. | 714/6 |

(Continued)

OTHER PUBLICATIONS

Menon, Jai, "A Performance Comparison of RAID-5 and Log-Structured Arrays", 1995, IEEE.*

*Primary Examiner*—Scott Baderman
*Assistant Examiner*—Gabriel L. Chu
(74) *Attorney, Agent, or Firm*—Blakely, Sokoloff, Taylor, Zafman, LLP

(57) ABSTRACT

This invention describes a high-performance, log-structured implementation of a RAID subsystem that can be efficiently implemented in software. The methods described in this invention are extraordinarily well suited for software-based RAID 5 systems. In one embodiment, the disk storage subsystems receiving a request to write data. Thereafter, the write operation is appended to a first log to identify a storage location of data written to the disk subsystem, wherein the first log consists of a sequence of segments, the segments consist of a sequence of variable length stripes, a length of a stripe varies based on a quantity of disks addressed by a stripe. In response to adding a disk to the disk storage subsystem, increasing a length of the stripes and increasing a number of disks available for striping data. Alternatively, in response to a disk failing within the disk storage subsystem or a disk being removed from the disk storage system, narrowing a length of the stripes.

20 Claims, 4 Drawing Sheets

U.S. PATENT DOCUMENTS

| | | | |
|---|---|---|---|
| 6,021,509 A * | 2/2000 | Gerdt et al. | 714/7 |
| 6,058,489 A * | 5/2000 | Schultz et al. | 714/7 |
| 6,223,300 B1 * | 4/2001 | Gotoh | 714/5 |
| 6,507,890 B1 * | 1/2003 | Morley et al. | 711/114 |
| 6,651,154 B1 * | 11/2003 | Burton et al. | 711/202 |
| 6,745,284 B1 * | 6/2004 | Lee et al. | 711/114 |
| 2002/0118582 A1 * | 8/2002 | Butterworth et al. | 365/200 |
| 2003/0188097 A1 * | 10/2003 | Holland et al. | 711/114 |

* cited by examiner

SELF-HEALING LOG-STRUCTURED RAID

The present application claims priority to provisional U.S. application No. 60/343,942 titled High-Performance, Log-Structured RAID filed Dec. 26, 2001, which is incorporated herein by reference.

FIELD OF THE INVENTION

This present invention relates generally to methods for designing and implementing RAID subsystems and storage virtualization.

BACKGROUND OF THE INVENTION

RAID5

RAID5 is one of the methods for achieving higher performance and greater resilience to drive component failure that was originally developed by the U.C. Berkeley RAID team in the late 1980s and early 1990s under the auspices of principal investigators David Patterson, Randy Katz and their students. RAID is an acronym that refers to Redundant Array of Inexpensive Disks, and the original RAID project was conceived as a way to exploit the benefits of high volume magnetic disk drives by using strings of lower cost drives together in order to achieve the same benefits as more expensive storage configurations popular in the high end systems of the day. The groundbreaking work of the RAID team and the industry acceptance that shortly followed have made RAID strategies and resultant technologies the ascendant paradigm for dealing with magnetic disk storage today. Background of the different flavor of RAID can be found in "RAID: High-Performance, Reliable Secondary Storage" by P. Chen et al., ACM Computing Surveys, 1994 and its references.

RAID5 specifically is a methodology for achieving redundancy of data on a group of drives without sacrificing ½ of the available capacity as mirroring (RAID1) and its variations (i.e., RAID 10) do. RAID5 achieves this storage efficiency by performing a parity calculation on the data written to disk and storing this parity information on an additional drive. Should a disk drive fail, the data can be recovered by computing the missing data using the parity and data blocks in the remaining drives. RAID5 is an especially popular methodology for achieving redundancy because it is more economical than RAID 1insofar as more disk drive capacity can be rendered usable from a group of active drives. It has been estimated that RAID5 accounts for 70% of all drive volumes shipped into RAID configurations (the actual percentage of RAID5 per discrete RAID configuration is lower, given the popularity of striping and mirroring with OLTP). This would be sensible given that RAID5 is typically associated with file serving and similar workloads, which account for significantly more capacity usage on a global basis than higher intensity OLTP workloads, for which RAID5 is rarely used.

The attractiveness of RAID5 to the ATA storage opportunity is even more pronounced. Given the great volumetric density advantages of the ATA platform versus SCSI and Fibre Channel, ATA is ideally suited for larger capacity storage installations. The capacity efficient RAID Level 5 is functionally allied with this focus on maximum capacity per dollar of storage cost. In the storage market, given its long evidenced storage elasticity, greater volumetric densities will be accompanied by a growth in the desire to maximize capacity as well as prevent disruption from drive failure. In this view data protection based on parity strategies, as opposed to redundancy ones, will be maximally appealing—provided that they pose no crippling obstacles in their implementation.

Today, even for expensive solutions on SCSI and Fibre Channel platforms, there are obstacles to the universal ascendance of RAID Level 5 and the foremost among these is speed. For instance, one reason that RAID5 is rarely used for OLTP application storage is because of its low performance for such workloads. As a tradeoff to its storage efficiency benefits, RAID5 imposes additional computational as well as I/O burdens on the underlying magnetic disk storage. These additional burdens in many cases result in the general characterization that RAID5 is slower than other types of RAID. And, in fact, with many commercial RAID controller technology—both hardware and software—RAID5 is often the slowest performing configuration, especially when compared to straight striping (RAID0), mirroring (RAID1) or striping+mirroring (RAID 10). In some cases, for instance software RAID from vendors like VERITAS, the difference in performance between RAID5 and RAID0 is as much as 10×.

Conventional RAID5 Performance Penalties

The reason that RAID5 imposes performance penalties when compared to other methods of RAID is due to two principal and related requirements. The first is the calculation of the parity itself, which requires computational resources and takes place in real time. This calculation can be accelerated by the use of specialized hardware such as an XOR engine, and most hardware RAID controllers employ this type of component to assist performance. The second performance cost, by far the most extensive, is due to the way that RAID5 typically conducts its writes. This process is called Read-Modify-Write.

During the process of a sequential write, the RAID5 implementation will attempt to write data in full stripes corresponding to the number of drives in the RAID group. However at the end of any sequential write process and during any modification of data in place, it is not possible to write a complete stripe and the technique of Read-Modify-Write must be employed. The Read-Modify-Write process is the prototypical RAID5 process and it is responsible for much of the performance limitations seen in most implementations of RAID5.

In a typical Read-Modify-Write operation, multiple I/Os must be executed for each logical write request. The first I/O involves reading an existing block or sequence of blocks on the disk. The second I/O involves reading the parity associated with the block(s) that will be modified. The third I/O involves writing the new data blocks, and the fourth I/O involves updating the parity associated with the relevant block(s) corresponding to the new data that is being written. No matter how small the set of drives that comprise the RAID group, the minimum number of I/Os required in a single write operation that involves the standard Read-Modify-Write approach is four, with an even greater number of I/Os associated with multiple data block writes in larger RAID sets. Furthermore, certain approaches to ensuring reliability in RAID5 implementations (see section below) involve additional I/O activity such as logging atomic parity updates separately which increases the minimum number of Read-Modify-Write I/Os to six or higher. FIG. 1 shows a typical read-modify-write process. In this figure, it is desired to update block D2 with D2'. It is also necessary to update the parity P to P'. Two reads are needed to obtain block D2 and P. D2' and P' are then computed. Finally, two writes are performed to write D2' and P' to disks.

Because of the multiple I/Os required in existing RAID5 implementations, write performance is characteristically poor, often 5x–10xslower than mirroring or striping alternatives. There are hardware limits to the performance that is achievable given the amount of I/O activity that is generated upon each write.

In addition to low write performance, conventional RAID5 implementations have other performance limitations that are unique to its RAID flavor. Two of the most common are RAID group initialization and RAID group rebuilding. In RAID5 group initialization, the RAID solution needs to perform a scan of every data sector on each disk in the RAID set and initialize the corresponding parity. This initialization process is time consuming, the magnitude of which is directly related to the size of the RAID set and the capacity of each drive in the group.

RAID5 rebuilding is a process that must occur after a RAID5 set experiences a disk failure. When a disk fails in a RAID5 set, the missing data and parity contained on the failed drive must be regenerated on a replacement drive once the new working drive is inserted into the set or an existing hot spare is activated as the replacement drive target. Similar to initialization, the process of rebuilding requires that each data block on the system is read and the XOR computations are performed in order to obtain the absent data and parity blocks, which are then written onto the new disk. Often, during the process of reading all data from the disk to recompute the missing data and parity, bad sectors may be encountered, and it is no longer possible to rebuild the array. Depending on the size of the RAID group and the capacity of each drive, the rebuilding process is time consuming and may degrade the use of the drives in the RAID5 set for normal activity. Both the initialization and the rebuild processes are additional performance and reliability penalties of conventional RAID5 implementations that will occur as a matter of normal operation.

Conventional RAID5 Reliability Penalties

Based on the dominant approach to implementing RAID5 at present, there are several discrete reliability problems that arise in common implementations. Many of these reliability concerns are generated by events like power failure, which can often set in motion a cascade of correlated failures. For instance, a power failure not only interrupts active writes, which can invalidate any parity that is in the process of being updated, but can also burn out disks with aging components. As a result, power failures can often cause data loss in many types of RAID implementations by destroying both the parity and data associated with a "parity stripe." Part of this is due to characteristics of the ATA platform itself, such as differences in assembly line quality control processes that have more tolerance for production variability. However a large part of the quality differential is due to ineffective strategies employed by the ATA RAID community using legacy RAID methodologies.

The most salient reliability problem in the ATA RAID arena is the nearly universal use of write back caching in all ATA implementations, even those driven by hardware RAID solutions. Write back caching is a function that is enabled by the inclusion of small cache memory components within the disk drive electronics. By providing this additional memory, the drive is able to commit to write commands by buffering bursts of data in memory prior to the full completion of writing data onto the disk platter. When the drive signals that a write has been completed, the application moves on to its subsequent operation even if the data in question remains in the drive's write back cache. Quicker completion of writes leads to faster application performance when disk latency is the primary performance limitation. Because of this, the logic behind making write back caching a default strategy is straightforward: to increase the performance of the disk platform.

This performance enhancement is understandable given ATA's traditional role as a desktop device with most target implementations limited to one or two drives. Drive manufacturers have sought to differentiate the high-volume ATA offering from the higher margin SCSI and Fibre Channel drive business by limiting rotational speed thresholds on the platform. This gives pressure to optimize for performance gains like those presented by write back caching, and for the most part the industry benchmarks the ATA platform with write back caching enabled. It is possible that this will change in the future, but at the present moment this strategy is so pervasive that drive manufacturers presume write back caching to be enabled when certifying their ATA products.

Though performance enhancement is helpful, the use of write back caching in ATA RAID implementations presents at least two severe reliability drawbacks. The first involves the integrity of the data in the write back cache during a power failure event. When power is suddenly lost in the drive bays, the data located in the cache memories of the drives is also lost. In fact, in addition to data loss, the drive may also have reordered any pending writes in its write back cache. Because this data has been already committed as a write from the standpoint of the application, this may make it impossible for the application to perform consistent crash recovery. When this type of corruption occurs, it not only causes data loss to specific applications at specific places on the drive but can frequently corrupt filesystems and effectively cause the loss of all data on the "damaged" disk.

The reason that this more global type of corruption occurs is due to another problem with using a write back cache. This second problem involves the sequencing of data that enters and exits the write back cache. That is, ATA drives are free to reorder any pending writes in its write back cache. This allows the write back cache to obtain additional performance improvements. Instead of issuing sector commitments and then initiating rotational seeks for each sector in the exact sequence that commits were made, the drive places data on sectors that it encounters as platters rotate through an increasing or decreasing sector path. This reduces seek times and speeds up cache throughput. However, if a power or component failure occurs during a write process, the identity of sectors that make it to disk will not correspond to the sequence in which they were written. This causes corruption as applications are unable to recover from drive failures because they have no way of resolving the order in which data made it to the disk media versus which data was lost in cache. Even if individual drives did not reorder writes, there is no convenient way of preventing the reordering of writes that are striped across multiple drives that use write back caching, since any individual drive is unaware of the writes being serviced by another drive.

These write back cache problems are a common cause of data corruption. In fact the weakness of the write back cache is even a relatively well understood problem, and in higher end drive platforms RAID devices and sophisticated storage administrators will default to a policy of prohibiting the use of the SCSI write back cache. However, in the ATA RAID arena, the write back cache is usually enabled by default, and performance measurement is conducted with the caching enabled, which is misleading given that the reliability implicit in RAID is compromised by the use of write-back-caching.

Deactivation of write-back caching prevents the most severe of the ATA RAID corruption problems. The tradeoff for RAID5, however, involves even lower performance. As discussed in the previous section, the legacy methodologies for RAID5 impose a significant performance limitation on this type of RAID, one that is partially addressed by vendors through the default use of write-back caching. Unfortunately, deactivating write back caching usually has a dire effect on performance.

And yet, there is a further dilemma. Since ATA vendors are not currently certifying the recovery of drives that deactivate write-back caching, it is possible that drives operating without this function will have greater failure rates. So, while vendors do achieve the goal of preventing an obvious source of data corruption, they run the risk of increasing drive failure.

The other showstopper problem posed by disk failure in ATA RAID5 solutions is the parity recalculation problem. If the system crashes during the middle of a write process, the parity calculation that applied to the active data write may be inconsistent. As a result, when the system is powered back on, it is necessary to regenerate this parity and write it to disk. Since the system will not be able to determine where the last active write was in progress, one solution is to recalculate all of the parity on the RAID5 group. This recalculation process takes time and every sector of each participating RAID group must be scanned. Based on various leading system implementations currently available, the parity recalculation process can take between forty-five minutes for a standard RAID5 group of five or six drives to several hours for larger sets.

Currently, the parity recalculation problem is a significant drawback of software RAID5 solutions. There is no easy way to avoid this penalty when using the traditional read-modify-write approach to RAID5. Some RAID5 solutions in the ATA universe do avoid this limitation, however, through the use of "pointers" that records the positions of the in-place updates. These pointers are stored either on another disk or within a small NVRAM component. This technique is called "dirty region logging." If the pointer is stored on another disk, it generates an additional I/O step that will further degrade performance. Nonetheless, it will deliver a performance benefit by avoiding the need to recalculate all parity upon power failure; however, it does not eliminate the associated reliability problem since, in the event of a crash, some parity will still be left in an inconsistent state until recovery can be performed. If dirty region logging is combined with write-back-caching, the original reliability problem caused by a power failure or power spike event will result in inconsistent or corrupt data. Another solution is to log the data and parity to a separate portion of the disks before responding to the write request; the logged data and parity are then copied to the actual RAID stripe. In the event of a failure, the data and parity can be copied back to the RAID stripe. This approach, while much more reliable than dirty region logging, imposes additional disk latency and makes RAID5 writes significantly slower.

A complete, high-performance way around these parity update problems in RAID5 is to use significant quantities of NVRAM with reliable battery backup. Unfortunately, the use of NVRAM will tend to degrade RAID5 performance for streaming where throughput rather than latency is important. NVRAM is often employed in higher-end SCSI and Fibre Channel RAID controllers because it improves performance for many applications and confers reliability benefits in the face of power failure. Nevertheless, it is undesirable for the ATA world to move to this type of solution. One of the most important aspects of the ATA storage opportunity involves its cost savings over alternative drive platforms. Given this, vendors do not have the luxury to equip ATA RAID solutions with a lot of expensive hardware components. Moreover, there is some expectation within the ATA community that the widespread adoption of serial ATA will result in an increase of drive counts within standard rackmount servers. In many of these scenarios, the real estate required for additional board-level components will not be readily available on motherboards or easily addressable through the use of expansion boards. This means that the ATA world will continue to have relatively few options available for addressing reliability concerns associated with RAID5 implementations simply by applying more hardware.

Challenges in Developing a Flexible and Reliable RAID 5 System

There are several factors that make implementing a flexible and reliable RAID 5 system difficult:

Atomic parity update.
Small writes require read-modify-write disk operations.
Inflexible fixed data mapping.

RAID 5 must maintain a parity checksum across multiple disks. When updating data stored in a RAID 5 system, the data and corresponding parity are updated at slightly different times. Therefore, there is a brief period during which the parity does not correspond to the data that is stored on disk. If the system crashes or loses power at this time, the parity may be left in an inconsistent state and is useless. If no disks have failed, and we know which parity stripes were being updated at the time of the crash, the parity can be reconstructed when the system reboots. However, if there is already a failed disk or if a disk fails after a system crash, then the inconsistent parity cannot be used to recover the lost data. Unfortunately, it is common for power failures to simultaneously crash systems and destroy disks.

Contrast this with mirroring, in which case a crash may result in different data stored on the two disks but either copy of the data is valid, and the two copies can be made consistent by copying one copy to the other. To solve this problem, it is desirable to make the parity update in RAID 5 systems atomic. Note that most low-end RAID 5 systems probably do not support atomic parity updates and therefore cannot be used in any serious storage application.

Most commonly, parity updates can be made atomic by logging the data and parity to a separate device before updating the data or parity. Hardware RAID controllers typically use nonvolatile memory. Software RAID systems in particular usually cannot assume the existence of a nonvolatile memory device and must log the data and parity to a disk. This greatly increases the latency for write operations, particularly since many logging systems require more than one synchronous disk operation (write log entry+ update size of log) in order to append to a log.

Another problem with RAID 5 systems is that small writes require reading the old data and old parity and xoring it with the new data in order to generate the new parity. This read-modify-write operation can result in up to four disk operations for each small write to a RAID 5 system. Most hardware disk arrays will buffer small writes in nonvolatile memory, in the hopes of accumulating enough sequential data to avoid performing read-modify-write operations. However, this does not work for small random writes, and most software RAID 5 implementations do not have the luxury of nonvolatile memory.

Finally, most RAID 5 systems use inflexible, fixed data mappings that make it difficult to accommodate the addition, removal or failure of a disk. In fact, most RAID 5 systems implement a fixed width parity stripe with a dedicated spare disk. The spare disk sits idle until a disk fails. A more flexible approach would be to always compute parity across all available disks and simply reserve enough spare capacity to recover a failed disk. This means that the width of a parity stripe would vary as disks are added, fail, and are replaced. By varying the width of the parity stripe we avoid the need to reserve a dedicated spare disk or wait for a spare disk to be added if there are no additional spares. Instead, we simply narrow the width of a parity stripe whenever a disk fails and widen the width whenever a disk is added.

SUMMARY OF THE INVENTION

This invention describes an improved way to implement RAID 5 by using a log-structured approach. The methods described in this invention are extraordinarily well suited for software-based RAID 5 systems.

In one embodiment, the disk storage subsystems receiving a request to write data. Thereafter, the write operation is appended to a first log to identify a storage location of data written to the disk subsystem, wherein the first log consists of a sequence of segments, the segments consist of a sequence of variable length stripes, a length of a stripe varies based on a quantity of disks addressed by a stripe. In response to adding a disk to the disk storage subsystem increasing a length of the stripes and increasing a number of disks available for striping data. Alternatively, in response to a disk failing within the disk storage subsystem or a disk being removed from the disk storage system, narrowing a length of the stripes.

The methods described herein allow very high-performance, reliable and flexible implementations of RAID 5 subsystems.

DETAILED DESCRIPTION

Definitions

VDisk
  Virtual disk (volume).
  Primary user visible abstraction.
  Users can create and destroy virtual disks on demand.
  Users can also create snapshots of virtual disks.

Disk (251)
  A physical disk.

VAddr
  Virtual disk address <VDisk, offset>.

PAddr
  Physical disk address <disk, offset>.

Sector (241)
  A disk sector.
  Almost always 512 bytes in size.
  Writes to sectors are atomic.
  Writes to anything larger than a sector may not be atomic.

Page (231)
  Smallest unit of storage allocation/mapping.
  Usually somewhere between 32 KB and 1 MB in size.
  Consists of whole sectors.

Stripe (221)
  A collection of pages over which parity is computed.
  For example, a stripe may consist of a page from each of disks A, B & C, with C storing the contents of A xor B.
  For reliability, a stripe should consist of no more than one page from each disk.
  A stripe may vary in size depending on the amount of data the parity is computed over.

Segment (211)
  Large fixed sized chunks of disks used for garbage collection.
  Free space is reclaimed by garbage collecting segments.
  Segments are linked together to create a log.
  Segments contain stripes.

Log (201)
  An append-only data structure.
  Conceptually, we organize all disk storage into a large log.
  Consists of segments that are linked together.

Overview

Figure 1:
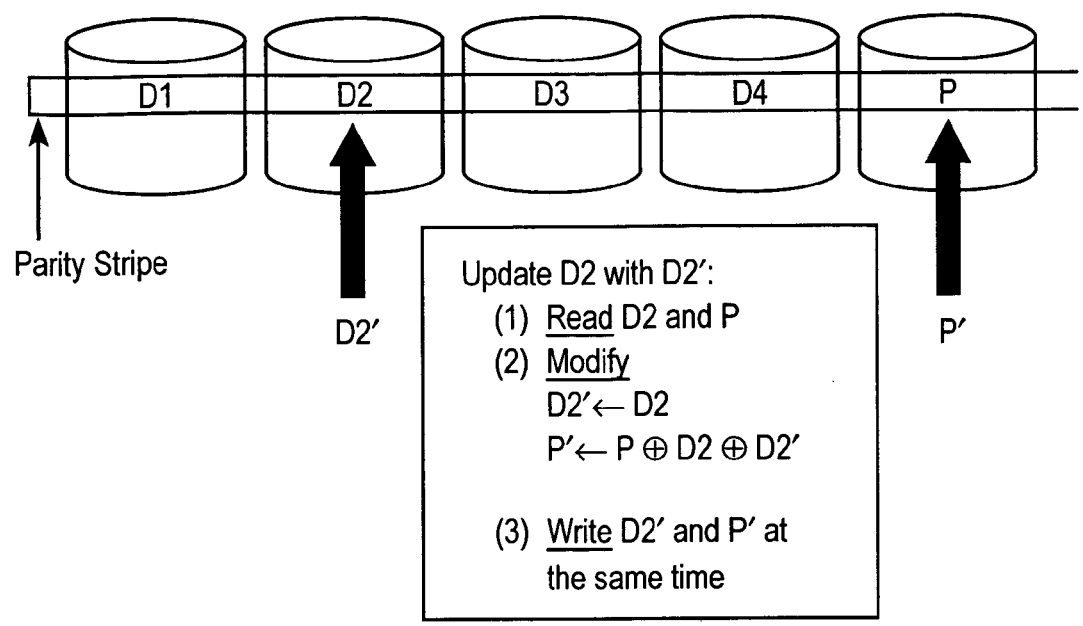
FIG. 1: Read-Modify-Write Process. Illustrates the process of updating a partial stripe in a typical RAID5 implementation.
Figure 2:
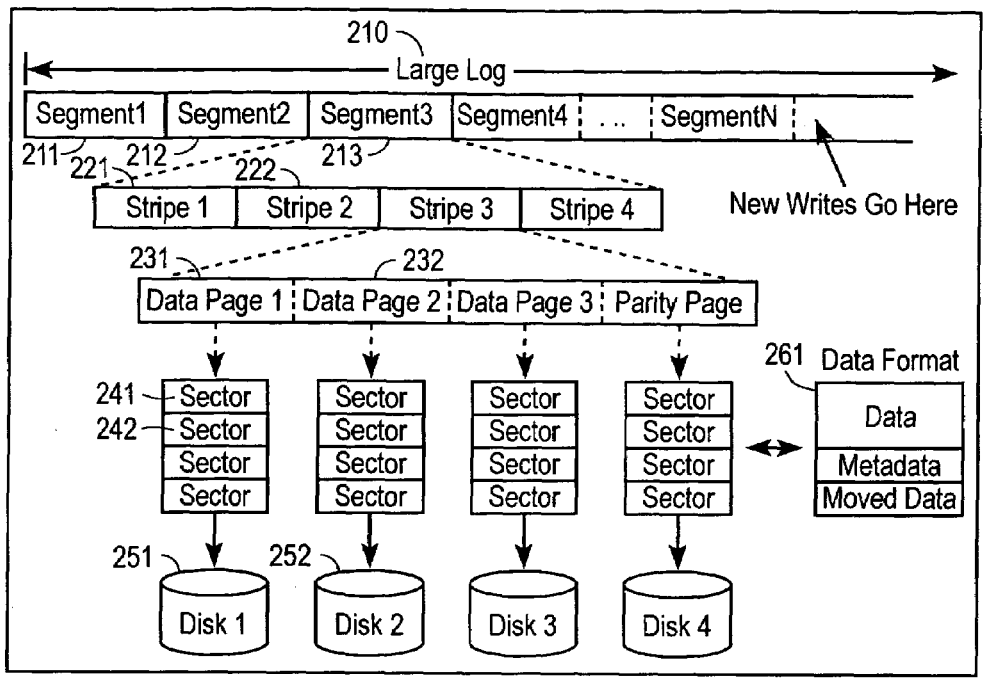
FIG. 2: Organization of Data on Disk and the hierarchical composition of data structures. Illustrates the primary on-disk organizational structures.

As illustrated in FIG. 2, we organize disk storage into a large log. The log consists of a sequence of segments. The segments on a disk are organized contiguously, but the order of segments in the log does not have to be contiguous. Segments consist of a sequence of variable length stripes. The stripes consist of a sequence of pages. Pages consist of a sequence of contiguous sectors. For reliability, each page in the same segment is located on a different disk.

All updates append sequentially to the log. These results in very high write throughput even for small random writes, which is a weak point for conventional RAID 5 implementations. Free storage is reclaimed by garbage collecting segments that contain overwritten, no longer needed data.

In addition to achieving very high performance, the RAID system described herein provides several other useful functions. For example, all physical disk storage is organized into a common disk pool. Users may create and destroy virtual disks on demand without worrying about which physical resources to allocate to these virtual disks. An administrator need only periodically monitor the total amount of free space remaining in the system.

Requirements and Assumptions

The performance of the system should be similar to that of hardware RAID 5 controllers, and should not consume much CPU cycles. In particular, the throughput of the system should achieve many tens of MB/s in throughput, particularly for write operations. We assume that disk sectors are always written atomically or generate an error when read back, but anything larger than a sector may We assume that disks may reorder write operations. This is particularly true of ATA disks with write back caching enabled. (This is unimportant assumption that can help us achieve significantly higher performance.)

Efficiently Appending to a Log

In the ideal case, appending to a log should require only a single synchronous disk write operation. Also, we must be able to reliably identify the end of a log during crash recovery.

One approach uses a separate sector to store a pointer to the end of the log. With this approach, data is first written to the end of the log and then the pointer is updated to point to the new end of the log. The problem with this approach is that it requires two synchronous disk operations.

A second approach is to include a sequence number in every sector that is written to the log. The sequence number is incremented each time that the log wraps around. During recovery, the log is scanned forwards until the sequence number decreases, indicating the end of the log. This approach requires only a single sequential write operation to append to the log; however, it requires initializing all sectors in the log to a known value before using the log and a few bytes must be reserved from each sector to store the sequence number. The sequence number must be stored in each sector rather than, for example, each page because only sector rights are guaranteed to the atomic. When a page write is interrupted, some sectors of the page may make it to disk while others sectors may not. There is also no guarantee as to what order in which the sectors will be written to disk.

We will be using the second approach to ensure that any write to a virtual disk incurs at most a single synchronous disk latency.

Computing and Storing Parity

When a full stripe, a stripe that spans the maximum allowed number of disks, is written, it incurs the minimum capacity overhead due to the parity overhead. Often, however, we will want to write stripes incrementally without waiting for a full stripe's worth of data to accumulate, such as when a small amount of data is written followed by a long pause. In general, we want to write the data to stable storage as soon as possible without waiting for the rest of the stripe to fill up; however, this incurs a higher parity capacity overhead. Fortunately, the excess storage can be easily removed when the segment is garbage collected.

Figure 3:
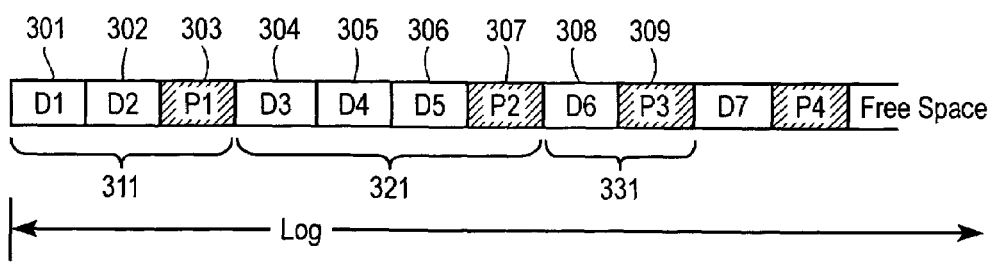
FIG. 3: Appending to a Log. Illustrates the log-structured nature of the write process.

FIG. 3 shows the process of appending to a log of stripes with varying sizes. Stripe 311 is made up of data page 301 and 302 and parity page 303. Stripe 321 is made up of data page 304, 305 and 306, and parity page 307. Stripe 331 is the shortest possible stripe, with one data page 308 and one parity page 309.

This method of writing out a non-full stripe is a key part of this invention. Traditional RAID5 implementation requires a full stripe before data is written out to disk. As such, a simple arithmetic formula is used in traditional RAID5 implementation to calculate the mapping between a logical and physical address. In this invention, a flexible table-look-up method is used to flexible convert between logical and physical address.

Garbage Collection

Figure 4:
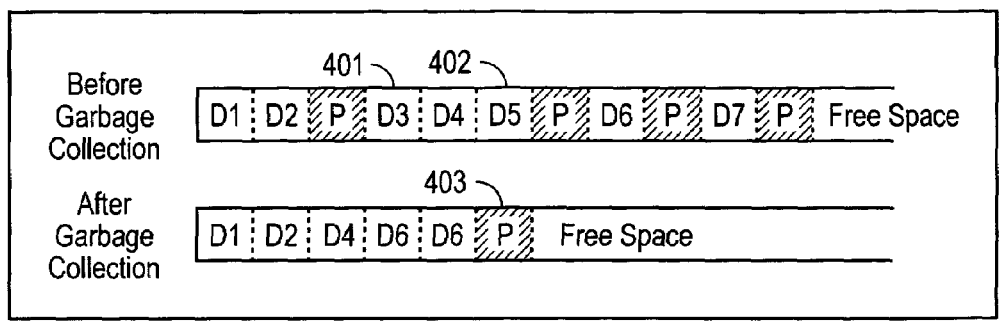
FIG. 4: Garbage Collection. Illustrates the compaction of parity information before and after garbage collection.

Eventually, the log will fill up and free storage must be reclaimed. Garbage collection is used to reclaim storage from pages that have been overwritten and are no longer needed. A garbage collector process periodically scans segments, throws away the overwritten pages, collects together the pages still in use, and appends the live pages to the current end of the log, creating free segments in the process. In FIG. 4, garbage collection eliminates the data blocks D3 and D5 (marked 401 and 402 on the figure) that have been overwritten and are no longer needed. Also, the stripes after garbage collection are longer, requiring only a single parity block (marked 403).

In actuality, there are two garbage collectors: a short-term collector and a long-term collector. The short-term garbage collector is responsible for ensuring that there are always a certain number of free segments. The short-term collector always collects segments that have the most amount of overwritten, and therefore free, space. This generates the most amount of free space for the least amount of work invested.

If we only had a short-term collector, free space would slowly accumulate in segments with otherwise "cold" data, reducing the amount of space available to the short-term collector to "age" recently written date. This would force the short-term collector to run increasingly more frequently on segments with less and less free space. The job of the long-term collector is to collect free space in these code segments, so that the short-term collector has more space to play with, and therefore wait longer, allowing more data to be overwritten, before garbage collecting a particular segment. In effect, the long-term collector can be viewed as a type of defragmenter.

From this discussion, it becomes evident that it is desirable to separate cold data from hot data since a segment containing mostly hot data will contain a large amount of free space and, therefore, require little work to garbage collect. To ensure this, the garbage collectors write surviving data into a separate "cold" log rather than appending it to the end of the same log that receives user requests. This prevents the hot and cold data from intermixing with each other. This method can be easily generalized to a hierarchy of logs containing ever colder data.

Checkpointing Metadata and Crash Recovery

Our RAID 5 implementation requires various types of metadata that are used for a range of tasks from mapping virtual disk addresses to physical disk addresses to keeping track of the amount of overwritten data in each segment. This metadata information must be recovered after a system crash. To bound the recovery time, it is necessary to periodically checkpoint the metadata to disk. We do this by periodically writing checkpoints to the end of a specially designated metadata log. Using a separate log for checkpoints prevents the metadata, from mixing with user data. Since the checkpoints are of a fixed size, the metadata log requires only a small fixed amount of disk space.

When the system is restarted after a crash, we first scan the metadata log to find the most recent checkpoint. The other logs containing the user data are then scanned forward from the points indicated in the checkpoint onto all logs have been processed. The system can then resume operation.

Figure 5:
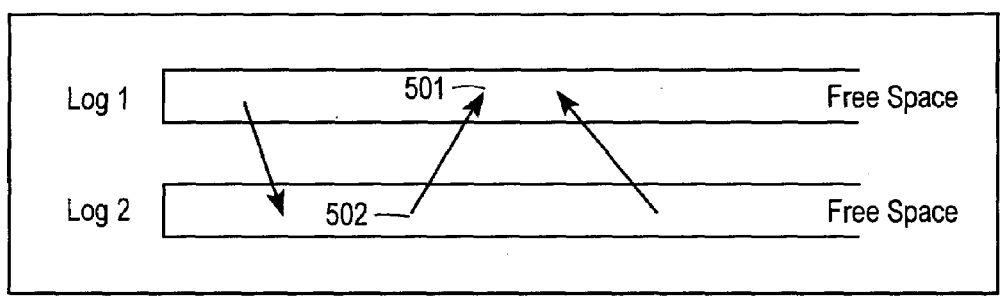
FIG. 5: Cross-Log Dependencies. Illustrates recovery dependencies between entries in two logs.

Note that in some cases, there may be dependencies in the order in which log entries in the various logs must be processed. These cross-log dependencies are explicitly noted as log entries in the logs themselves and are observed during recovery. In FIG. 5, entries after the point marked 502 in Log 2, cannot be processed until after Log 1 has been processed to the point marked 501. Processing of logs essentially performs a topological sorting of the entries in the logs. This mechanism for supporting multiple logs will also be used for future distributed versions of the system which allow multiple computing nodes connected over a network to share and access the same pool of disk storage Disk Failure Recovery When a disk fails, the stripes that span the failed disk are read and the data contained within those stripes are appended to the end of an appropriate log. For example, if a system originally has 6 disks, the maximum stripe width is 6. If a disk fails, the system will immediately switch to work with a maximum stripe width of 5: all new writes will be written with maximum stripe width of 5, and, all existing data can be read and rewritten with a stripe width of 5. After this rebuilding process is completed, the system will continue to tolerate single disk failure, without the need for a replacement disk to be put in place.

When the failed disk has been replaced, the system can switch dynamically back to work with a larger maximum stripe width. In the previous example, the system will switch back to use a maximum stripe width of 6 from a maximum stripe width of 5.

Adding and Removing Disks

When a disk is added, it simply increases the number of disks available for striping data. As a part of its normal process for garbage collection, the long-term collector will read the existing data and rewrite the data to span the new disk.

If a disk is about to be removed, then the disk is treated as if it had failed and the standard disk failure recovery mechanism is applied. One difference from the failed case is that a disk that is about to be removed may continue to service read requests. Once all data on the disk has been recovered, the disk is mapped out of the system and may be physically removed.

Benefits and Features

The log structured RAID approach in this invention also leads to several benefits and features not present in existing RAID solutions:

(1) Distributed Sparing

The system does not require the use of dedicated "spare" disks. Any data stored on a failed disk will automatically be recovered to spare capacity on the remaining disks. Therefore, all disks contribute to the performance of the system. Because a stripe may vary in the number of disks that it spans, when a disk fails, the width of the parity stripe can be narrowed rather than waiting for a new disk to be added to the system to restore full redundancy.

(2) Continuous Time Snapshots

Figure 6:
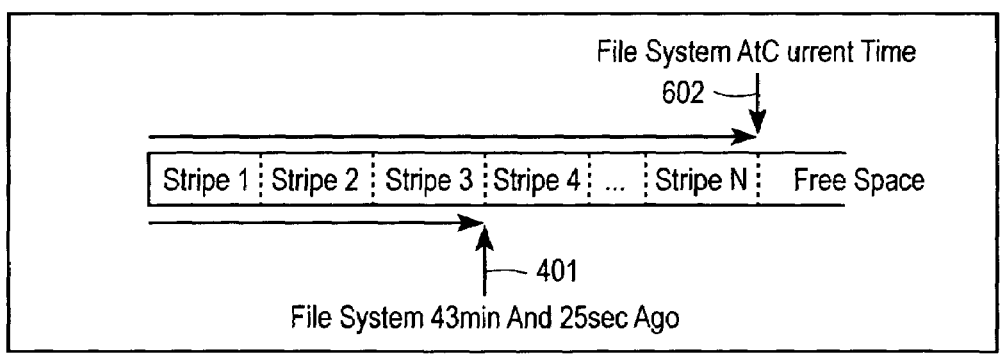
FIG. 6: Continuous Time Snapshots. Illustrates how the log-structuring can be used to implement continuous-time snapshots.

Because data is written to a log, we can configure the system such that data that has been written within the last n time units will not be overwritten is never overwritten. This allows us to travel backward to any point in time within the last n time units. This offers continuous time snapshots of the underlying storage system: in the context of using the storage system for file system, a continuous-time snapshot of the file system becomes available. In FIG. 6, 601 represents the state of the file system up to stripe 3 (hypothetically 43 min and 25 sec ago), and 602 represents the current state of the file system, which is up to stripe N. The non-overriding behavior of a log-structured data layout also simplifies the implementation of more traditional snapshot mechanisms where snapshots are created explicitly by a user.

(3) Networked RAID

The system is easy to expand to networked storage systems where disks may be accessed remotely over a network. In such systems, it is important to tolerate the temporary failure of a node that makes a disk inaccessible for a short period of time. In our system, if a disk becomes inaccessible we simply skip writing to the disk and initiate the recovery of data stored on that disk to protect against the event that the node does not recover. When the disk recovers, we can simply include the recovered disk in any new writes. Any data on that disk and before it became unavailable and has not yet been recovered it is still completely usable. The ability to handle transient failure, i.e., the graceful, incremental handling of disk failures is in sharp contrast to other types of networked or distributed storage systems in which a disk failure triggers the wholesale migration of data from the failed disk, with potentially a time-consuming recovery process if the disk recovers and becomes available again.

(4) High-Performance Remote Replication

Figure 7:
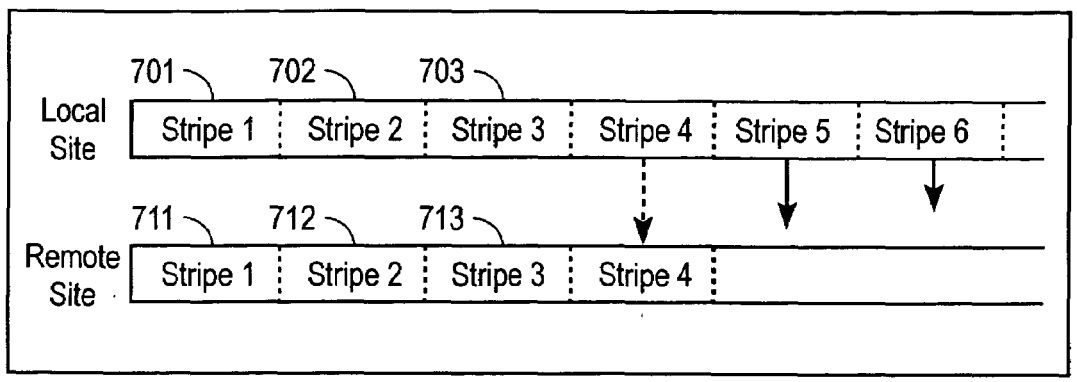
FIG. 7: High-Performance Remote Replication. Illustrates the replication of stripes on a remote system.

Because the log automatically captures causal dependencies between requests, high-performance remote mirroring is greatly simplified. Data in the log can simply be copied in any order as they are written to the log without worrying about sequencing the actual user requests. In FIG. 7, stripe 1 71 is replicated to remote site as strip 1 711, 702 replicated to 712, 703 to 713 and so on. This is particularly important for distributed storage systems, where there is usually no single central point that knows all of the causal dependencies between user requests.

(5) Generalized RAID that Tolerates k Disk Failures

This invention also supports generalized RAID that can tolerate k disk failures. RAID5 tolerates only one disk failure. When one disk fails, an expensive rebuild process has to be started immediately to guard against additional disk failure. With generalized RAID that tolerates k (k>1) disk failures, the rebuild process can be deferred to some later time, such as during midnight when the system load is much smaller.

Implementing a RAID system that tolerates k disk failure using traditional approach will incur significant disk latency in the read-modify-write process. For example, if it is desired to tolerate 2-disk failure, then there will be at least 3 reads and 3 writes in the read-modify-write process. Using the log-structure method in this invention, only one synchronous disk writes are needed regardless of the value of k.

The methods described above can be stored in the memory of a computer system (e.g., set top box, video recorders, etc.) as a set of instructions to be executed. In addition, the instructions to perform the method described above could alternatively be stored on other forms of machine-readable media, including magnetic and optical disks. For example, the method of the present invention could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the methods as discussed above, could be implemented in additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.); etc.

Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A method of storing data on a disk storage subsystem comprising:
   receiving a request to write data;
   appending each write operation to a first log to identify a storage location of data written to the disk subsystem, wherein the first log consists of a sequence of segments, the segments consist of a sequence of variable length stripes, a length of a stripe varies based on a quantity of disks addressed by a stripe;
   in response to adding a disk to the disk storage subsystem, increasing a length of the stripes and increasing a number of disks available for striping data; and
   in response to a disk being removed, decreasing a length of the stripe.

2. The method of claim 1, wherein in further response to a disk being removed, the method further comprises:
   treating the removed disk as if the removed disked had failed and performing disk failure recovery; and
   continuing to service read request to the disk until the disk is physically removed.

3. The method of claim 1, further including in response to a disk failure, deferring rebuild process until a predetermined time to tolerate multiple disk failures.

4. A method of storing data on a disk storage subsystem comprising:
   receiving a request to write data;
   appending each write operation to a first log to identify a storage location of data written to the disk subsystem, wherein the first log consists of a sequence of segments, the segments consist of a sequence of variable length stripes, a length of a stripe varies based on a quantity of disks addressed by a stripe;
   in response to adding a disk to the disk storage subsystem, increasing a length of the stripes and increasing a number of disks available for striping data; and
   in response to a disk failure, reading stripes that span a failed disk and appending the data within the stripes of the failed disk to the end of the first log.

5. A method of storing data on a disk storage subsystem comprising:
   receiving a request to write data;
   appending each write operation to a first log to identify a storage location of data written to the disk subsystem, wherein the log consists of a sequence of segments, the segments consist of a sequence of variable length stripes, a length of a stripe varies based on a quantity of disks addressed by a stripe; and
   in response to a disk failing within the disk storage subsystem or a disk being removed from the disk storage system, narrowing a length of the stripes.

6. The method of claim 5, wherein in further response to a disk being removed, treating the removed disk as if the removed disked had failed and performing disk failure recovery, and continuing to service read request to the disk until the disk is physically removed.

7. The method of claim 5, further including in response to a disk failure, deferring rebuild process until a predetermined time to tolerate multiple disk failures.

8. The method of claim 5, further including, in response to a disk failure, reading stripes that span a failed disk and appending the data within the stripes of the failed disk to the end of the first log.

9. The method of claim 5, further including in response to adding a disk to the disk storage subsystem, increasing a length of the stripes and increasing a number of disks available for striping data.

10. The method of claim 5, further including:
    in response to a disk failure, not writing additional data to the disk and performing disk failure recovery; and
    in response to the failed disk recovering, including the disk in new writes.

11. A machine readable-medium having stored there on a set of instructions, which when executed, perform a method of storing data on a disk storage subsystem comprising:
    receiving a request to write data;
    appending each write operation to a first log to identify a storage location of data written to the disk subsystem, wherein the first log consists of a sequence of segments, the segments consist of a sequence of variable length stripes, a length of a stripe varies based on a quantity of disks addressed by a stripe;
    in response to adding a disk to the disk storage subsystem, increasing a length of the stripes and increasing a number of disks available for striping data; and
    in response to a disk being removed, decreasing a length of the stripe.

12. The machine readable-medium of claim 11, wherein in further response to a disk being removed, the method further comprises:
    treating the removed disk as if the removed disked had failed and performing disk failure recovery; and
    continuing to service read request to the disk until the disk is physically removed.

13. The machine readable-medium of claim 11, further including in response to a disk failure, deferring rebuild process until a predetermined time to tolerate multiple disk failures.

14. A machine readable-medium having stored there on a set of instructions, which when executed, perform a method of storing data on a disk storage subsystem comprising:
    receiving a request to write data;
    appending each write operation to a first log to identify a storage location of data written to the disk subsystem, wherein the first log consists of a sequence of segments, the segments consist of a sequence of variable length stripes, a length of a stripe varies based on a quantity of disks addressed by a stripe;
    in response to adding a disk to the disk storage subsystem, increasing a length of the stripes and increasing a number of disks available for striping data; and
    in response to a disk failure, reading stripes that span a failed disk and appending the data within the stripes of the failed disk to the end of the first log.

15. A machine readable-medium having stored there on a set of instructions, which when executed, perform a method of storing data on a disk storage subsystem comprising:
    receiving a request to write data;
    appending each write operation to a first log to identify a storage location of data written to the disk subsystem, wherein the log consists of a sequence of segments, the segments consist of a sequence of variable length stripes, a length of a stripe varies based on a quantity of disks addressed by a stripe; and in response to a disk failing within the disk storage subsystem or a disk being removed from the disk storage system, narrowing a length of the stripes.

16. The machine readable-medium of claim 15, wherein in further response to a disk being removed, treating the removed disk as if the removed disked had failed and performing disk failure recovery, and continuing to service read request to the disk until the disk is physically removed.

17. The machine readable-medium of claim 15, further including in response to a disk failure, deferring rebuild process until a predetermined time to tolerate multiple disk failures.

18. The machine readable-medium of claim 15, further including, in response to a disk failure, reading stripes that span a failed disk and appending the data within the stripes of the failed disk to the end of the first log.

19. The machine readable-medium of claim 15, further including in response to adding a disk to the disk storage subsystem, increasing a length of the stripes and increasing a number of disks available for striping data.

20. The machine readable-medium of claim 15, further including:

in response to a disk failure, not writing additional data to the disk and performing disk failure recovery; and in response to the failed disk recovering, including the disk in new writes.

* * * * *